G. W. BILLINGS & J. HARRISON.
Vat for Retting Hemp and Flax.
No. 4,041.  Patented May 10, 1845.
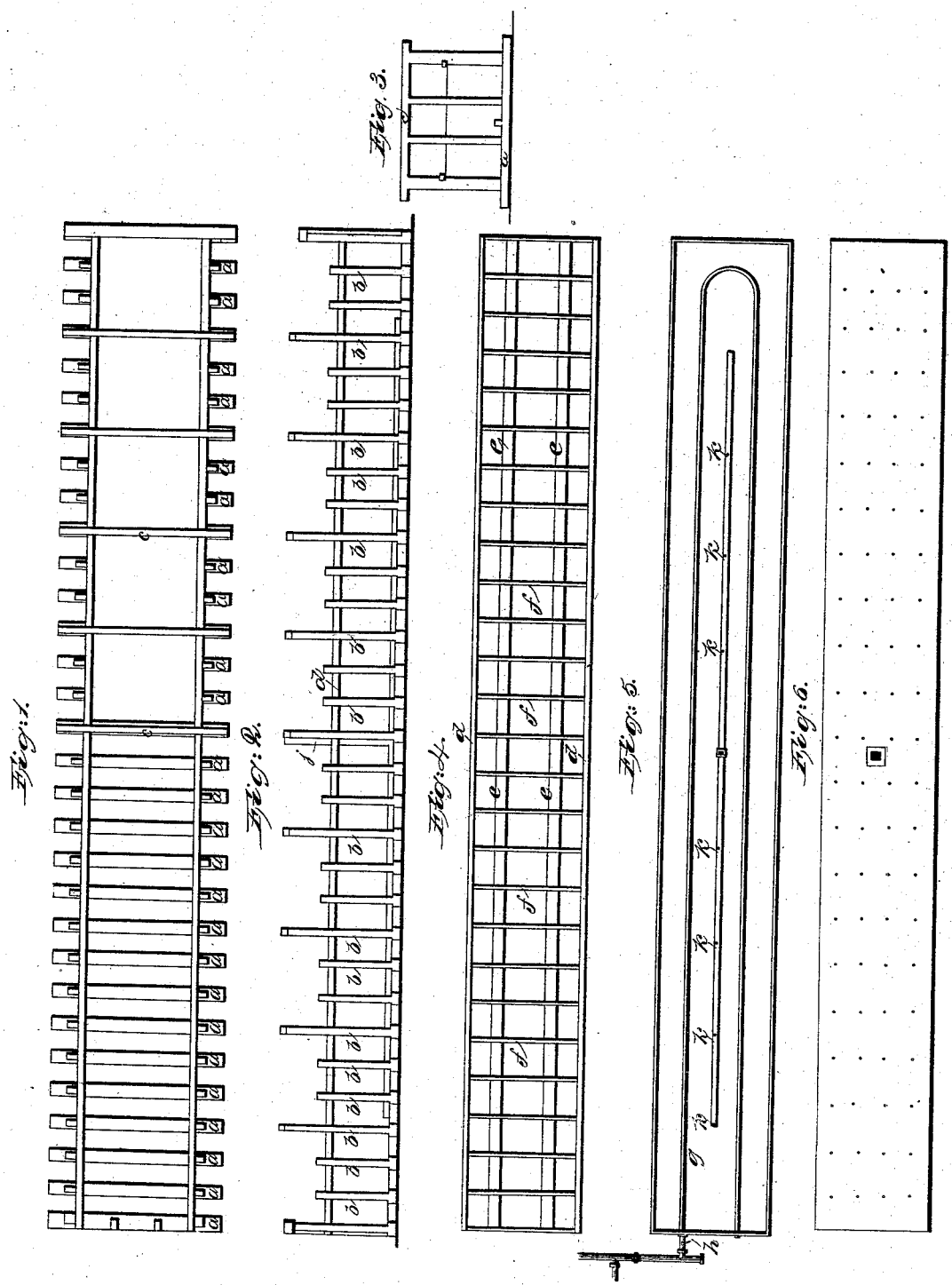

UNITED STATES PATENT OFFICE.

GEO. W. BILLINGS AND JOHN HARRISON, OF GLASGOW, MISSOURI.

IMPROVEMENT IN RETTING HEMP.

Specification forming part of Letters Patent No. 4,041, dated May 10, 1845.

*To all whom it may concern:*

Be it known that we, GEO. W. BILLINGS and JOHN HARRISON, of Glasgow, Howard county, and State of Missouri, have invented a new and useful Method of and Machinery for the Purpose of Water-Retting Hemp and Flax; and we do hereby declare that the following is a full, clear, and exact description of the construction and operation of the same, reference being had to the annexed drawings, making a part of this specification.

Figure 1 is a ground plan of the framework of our vat, in which we place the hemp or flax crosswise the same, for the purpose of its undergoing the retting process by keeping it immersed for a sufficient length of time in warm water, kept at an equal and uniform temperature by artificial means. Fig. 2 is a side elevation. Fig. 3 is an end elevation. Fig. 4 is an arrangement of pieces of timber placed upon the top of the hemp or flax after the vat is filled with the same, for preventing its rising and floating when the vat is filled with water. Fig. 5 is a view of the bottom of the vat, showing the arrangement of the steam-pipe $g$, for regulating the temperature of the water in the vat, and likewise the horizontal pipe $i$ running lengthwise through the center of the vat, for distributing the water simultaneously to every part of it through the openings $k\ k$ as it is admitted through the perpendicular supply-pipe $j$, rising from the center of the horizontal distributing-pipe.

$a\ a$ are the bottom cross-pieces of the frame of the retting-vat.

$b\ b$ are the posts at the sides of the vat, their lower ends being dovetailed into the bottom cross-pieces $a\ a$. Every second or third side post projects about one-third higher than the others, and are mortised into the cross-caps $c\ c$.

$d\ d$ are two strong pieces passing along each side of the vat just below the tops of the short side posts, and are firmly fastened to all of the side posts of the vat. The sides of the vat are planked up to the cross-pieces $d\ d$ and to the same height at the ends of the vat. The side pieces, $d\ d$, project about three inches inside of the planking of the vat. After the vat is filled with hemp or flax, the two long pieces of timber $e\ e$ are placed across it the entire length of the vat at about equal distances from each other and the sides of the vat. The cross-pieces $f\ f$ are then placed over and across the long pieces $e\ e$, and their ends secured by passing them under the projecting edges of the side pieces, $d\ d$.

$g$ is a steam-pipe, for regulating the temperature of the water in the vat.

$h$ is a valve for graduating the admission of steam into the steam-pipe $g$.

Fig. 6 is a platform perforated with holes, which is secured just above the steam-pipe $g$, and covers the entire bottom of the vat. Upon this perforated platform the hemp or flax rests when it is placed in the retting-vat, the openings in the platform distributing the heat communicated to the water between the bottom of the vat and the platform equally to every portion of the vat, by which means the retting process is carried on uniformly and simultaneously throughout every portion of the hemp or flax in the vat. The width of our improved retting-vats should be such that the hemp or flax can be conveniently placed in them crosswise. The usual size that we construct our vats for western hemp is ninety feet in length, ten and a half feet in breadth, and five feet in depth. After we have filled our retting-vat with hemp and secured it as herein described, we fill it with water raised to the temperature of 120° in a large cistern. The water is admitted to the retting-vat through the perpendicular pipe $j$ into the horizontal pipe $i$, and distributed through the cistern, as herein described. After the vat is filled with water, we keep it at an even temperature of 90° until the retting process is perfectly accomplished. The water is then drawn off and the hemp removed from the vat and placed upon scaffolds for drying. Keeping the water at the temperature herein described, we find that the average time consumed in perfectly accomplishing the retting of the hemp is from two and a half to three days, and for flax about one day longer.

Having thus fully described the construction of our improved retting-vat for flax or hemp and the manner of regulating and diffusing the temperature equally through every portion of the contents of the same while the retting process is in progress, we would remark that we do not claim the retting of hemp or flax by means of hot or warm water, as that has been done before; but What we do claim as new, and desire to secure by Letters Patent, is—

The performing the retting process upon hemp or flax by keeping it immersed in water kept at a uniform temperature by artificial means, and that temperature not to vary more than 20° or 30° from 90° of Fahrenheit's thermometer.

GEO. W. BILLINGS.
JOHN HARRISON.

Witnesses:
   JAMES R. SHEPHERD,
   W. B. PEMBERTON.